United States Patent [19]

Tophinke

[11] Patent Number: 4,478,226

[45] Date of Patent: Oct. 23, 1984

[54] SELF-PROPELLED HARVESTER THRESHER WITH AXIAL PRODUCT FLOW

[75] Inventor: Franz Tophinke, Harsewinkel, Fed. Rep. of Germany

[73] Assignee: CLAAS OHG, Harsewinkel, Fed. Rep. of Germany

[21] Appl. No.: 433,806

[22] Filed: Oct. 8, 1982

[30] Foreign Application Priority Data

Oct. 8, 1981 [DE] Fed. Rep. of Germany ....... 3139933

[51] Int. Cl.³ .......................... A01F 7/06; A01F 12/00
[52] U.S. Cl. .................................. 130/27 T; 130/27 P
[58] Field of Search ................. 130/27 R, 27 T, 27 S, 130/27 AB, 27 P, 27 Q; 56/14.6

[56] References Cited

U.S. PATENT DOCUMENTS

| | | | |
|---|---|---|---|
| 2,927,694 | 3/1960 | Scranto et al. | 130/27 Q |
| 3,229,696 | 1/1966 | Guillotin | 130/27 R |
| 3,430,633 | 3/1969 | Mark | 130/27 R |
| 3,794,047 | 2/1974 | De Coenr et al. | 56/14.6 |
| 4,117,849 | 10/1978 | Pakosh | 56/14.6 |
| 4,209,024 | 6/1980 | Powell et al. | 56/14.6 |
| 4,282,703 | 8/1981 | Wilson et al. | 130/27 AB |
| 4,338,955 | 7/1982 | Raineri | 130/27 R |
| 4,342,319 | 8/1982 | Willis et al. | 130/27 P |

*Primary Examiner*—Paul J. Hirsch
*Attorney, Agent, or Firm*—Michael J. Striker

[57] ABSTRACT

A self-propelled harvester thresher with axial product flow includes a housing having product inlet and product outlet openings, at least one axially extending rotor which forms together with the housing an annular chamber extending between the product inlet opening and the product outlet opening and having a separating zone, an inclined conveyor conveying the product to the product inlet opening, and a product transferring device located between the inclined conveyor and the separating zone and arranged so that it turns the product stream transported by the inclined conveyor, so that the product stream is supplied to the rotor.

8 Claims, 4 Drawing Figures

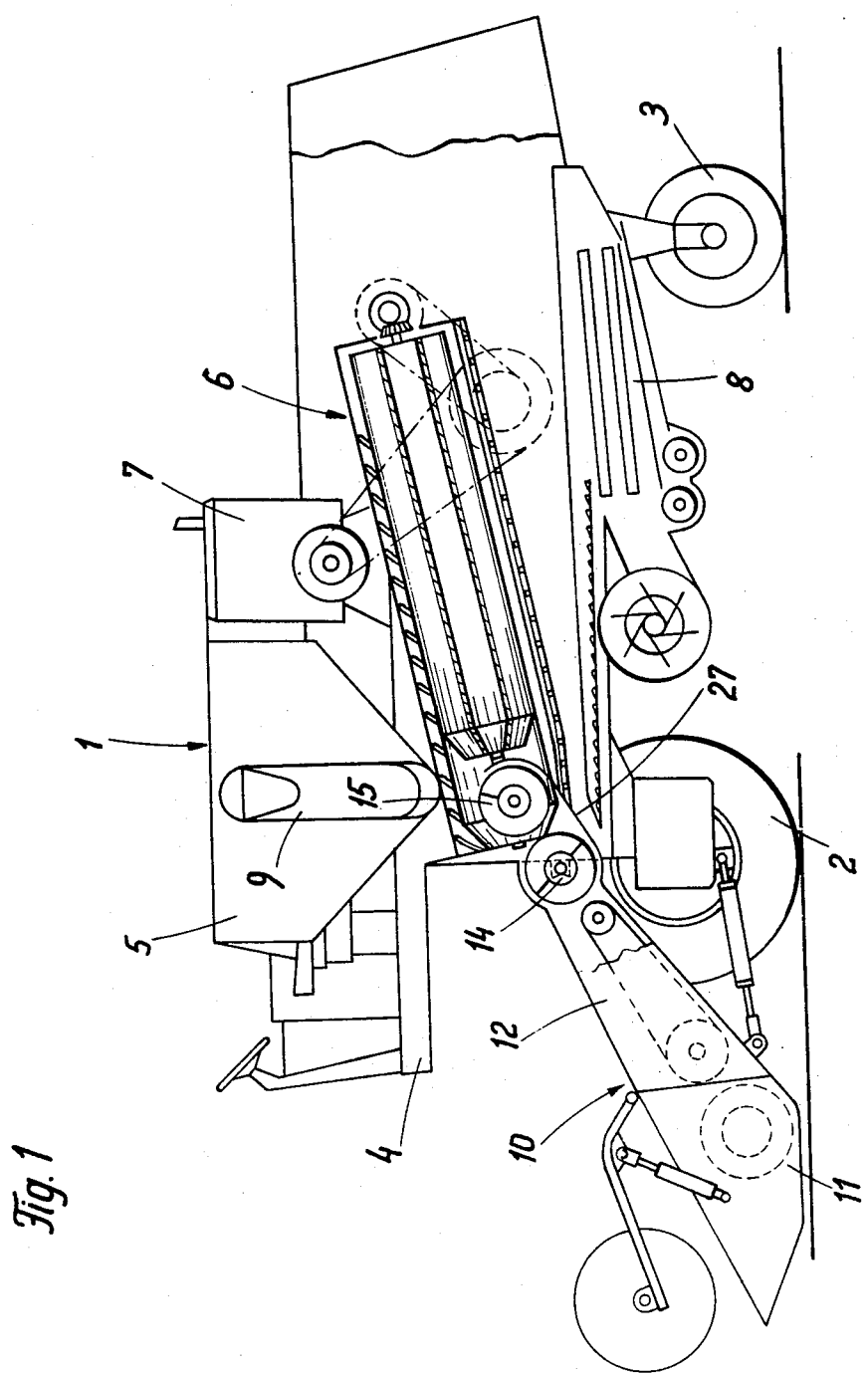

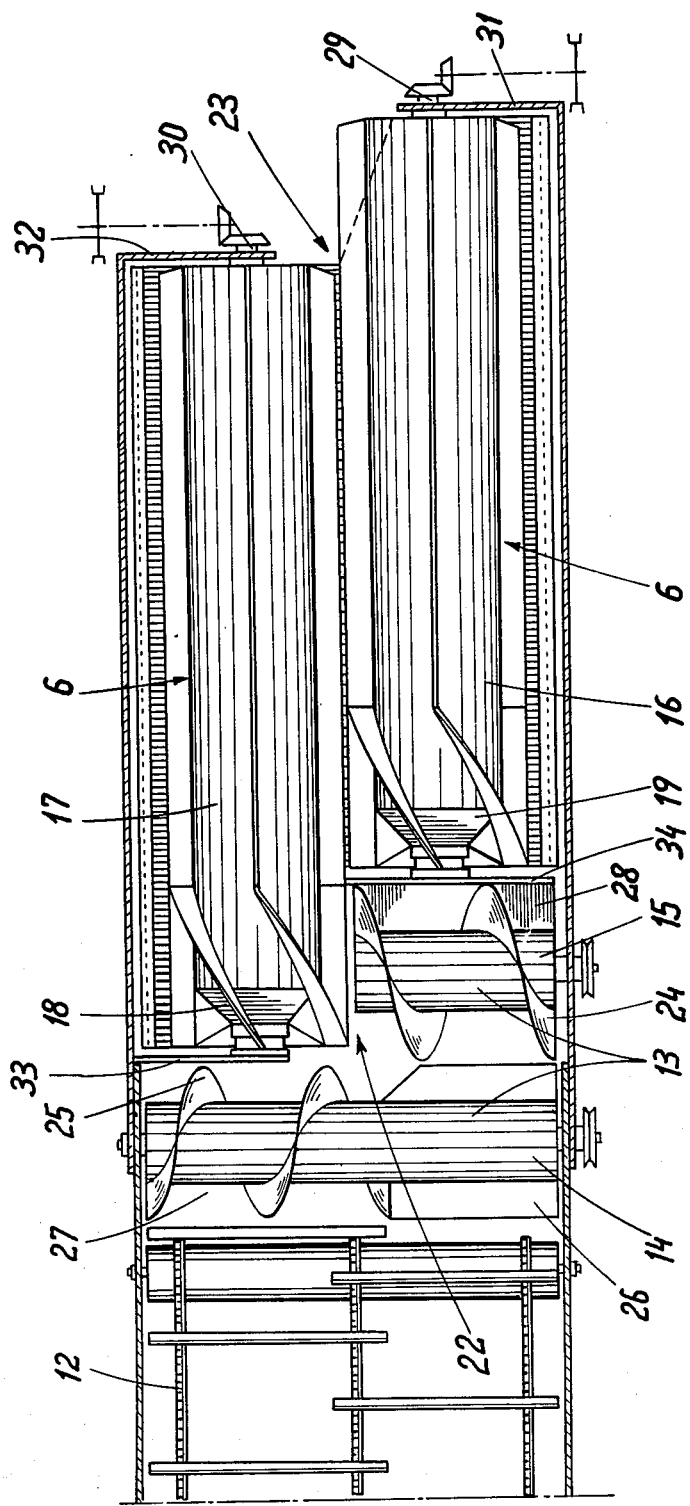

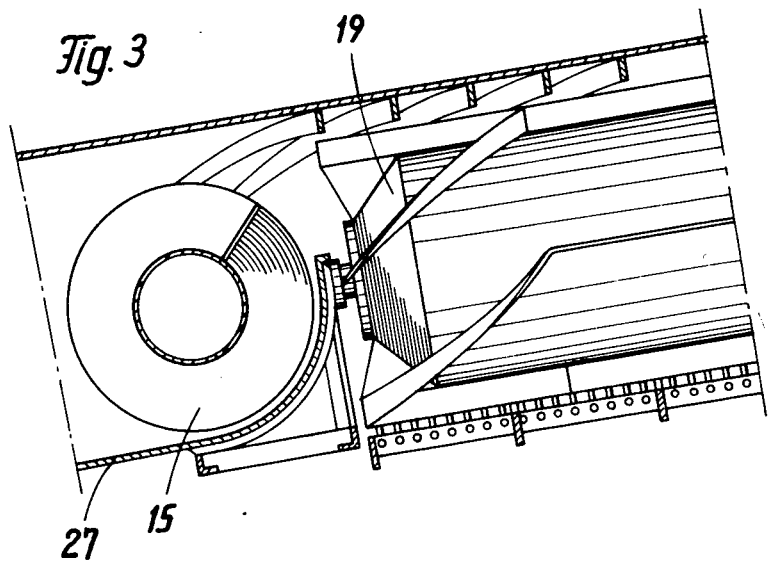
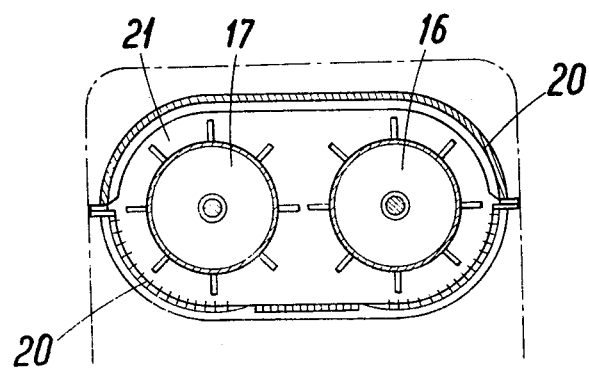

SELF-PROPELLED HARVESTER THRESHER WITH AXIAL PRODUCT FLOW

BACKGROUND OF THE INVENTION

The present invention relates to a self-propelled harvester thresher with an axial product flow.

Self-propelled harvester threshers of the above mentioned general type are known in the art. A known self-propelled harvester thresher with axial product flow has a housing which accommodates an axially extending rotor forming in the housing an annular chamber extending between a product inlet and a product outlet opening and has a separating zone, wherein the product is transported by an inclined conveyor and in some cases via a threshing element to the product inlet opening. The harvester thresher of this design cannot be used in practice for all conditions, despite its simple construction and high throughput in the sense of the efficiency of the axial threshing and separating parts. The problem in accordance with the applicant's opinion lies in the not satisfactory transfer of the harvested product from the inclined conveying device of threshing drum lying transversely behind the same in transporting direction, to the axial threshing or separating device.

SUMMARY OF THE INVENTION

Accordingly, it is an object of the present invention to provide a self-propelled harvester thresher of the above mentioned general type which satisfies the requirements in the sense of a satisfactory transfer of the product to the axial threshing device.

In keeping with these objects and with others which will become apparent hereinafter, one feature of the present invention resides, briefly stated, in a self-propelled harvester thresher in which product transferring means is provided between an inclined conveyor and a separating zone of an axially extending rotor and arranged so that the product transferring means turns a product stream transported by the inclined conveyor to supply the product stream to the rotor.

In accordance with another advantage feature of the present invention, the product transfer means arranged between the inclined conveyor and the separating zone is formed so that it turns the product stream by 90° and the product stream is supplied at a right angle to the rotor.

Still another feature of the present invention which provides for a very simple construction is that the product transferring means includes a first cylindrical body extending over the entire length of the inclined conveyor and having a first portion provided with screw blades and a second portion provided with axially extending shovel strips, and a second parallel cylindrical body provided exclusively with screw blades, wherein the discharge end of the second cylindrical body is connected with a product inlet opening of a product receiving stage.

A further advantageous feature of the present invention is that the portion of the first cylindrical body which is provided with the axially extending shovel strips has a length corresponding to the length of the second cylindrical body.

Still a further feature of the present invention is that the separating zone of the harvester thresher is simultaneously formed as a threshing zone and includes two parallel rotors which are axially offset from one another and surrounded by a housing, a product receiving stage and a product discharging stage is formed by the above-mentioned offset of the rotors relative to one another.

For providing smooth product flow, the above mentioned two rotors are driven so that they rotate in identical directions.

Finally, the cylindrical bodies can be associated with bottom members which at least in the region of the screw blades on the cylindrical bodies are trough-shaped.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view of a self-propelled harvester thresher in accordance with the present invention, with rotors;

FIG. 2 is a plan view of the inventive self-propelled harvester thresher in a longitudinal section through the housing of the rotors;

FIG. 3 is a view showing a section taken along the line III—III in FIG. 2; and

FIG. 4 is a view showing a section taken along the line IV—IV in FIG. 2.

DESCRIPTION OF THE PREFERRED EMBODIMENT

A self-propelled harvester thresher in accordance with the present invention is identified by reference numeral 1. The harvester thresher has two front driving wheels 3 and two rear steering wheels 3. Further, the harvester thresher 1 has a driver's cabin 4 and a grain tank 5. An axially extending threshing and separating device 6 is provided under the grain tank 5. A motor 7 for driving the harvester thresher and various working units are arranged behind the grain tank 5.

The threshing and separating device 6 operates with an axial flow. As known in other harvester threshers, a sieve air cleaning device 8 is arranged under the threshing and separating device 6. For discharging the grain material, a horizontally turnable emptying pipe 9 is attached on the grain tank 5. The harvested product receiving device 10 is located in the rear region of the harvester thresher and prior to the threshing and separating device 6. The harvester product receiving device 10 has a cutting mechanism 11 and an inclined conveyor 12 which conveys the product upwardly and rearwardly via a transferring device 13 through the threshing and separating device 6.

The transferring device 13 and the threshing and separating device 6 are shown in detail in FIG. 2. As can be seen from this Figure, the transferring device 13, which follows the inclined conveyor 12, has a first cylindrical body 14 extending transverse to the travelling direction of the harvester thresher 1 over the entire width thereof. A second cylindrical body 15 extends parallel to the axis of the first body 14 and is located behind the first cylindrical body 14 as considered in the travelling direction. The axial length of the second cylindrical body 15 substantially corresponds to half the length of the first cylindrical body 14.

The threshing and separating device 6 is connected with the above mentioned cylindrical bodies 14 and 15 and includes two rotors 16 and 17 extending in the travelling direction of the harvester thresher parallel to one another. The rotors 16 and 17 are axially offset from one another. The rotors 16 and 17 have identical designs. They have front catching portions which are identified with reference numerals 18 and 19 and have the shape of a truncated cone. Then each of the rotors 16 and 17 has a threshing zone which follows the catching zone, and finally a separating zone. Both rotors 16 and 17 are surrounded by a common housing 20 so that an annular space 21 is formed between the rotors 16 and 17 and the common housing 20. The rotors 16 and 17 are driven in identical directions.

The specific construction of the rotors 16 and 17 and the housing 20 are not described in detail, inasmuch as the harvester thresher in its axial design and thereby the general design of the rotors and respective associated housing parts are known for the artisan. The important feature of the present invention is the axial offset of both rotors 16 and 17 relative to one another. As a result of this, two stages are formed, namely a product receiving stage 23 and a product discharging stage 22, each having a respective opening in the housing.

The second cylindrical body 15 is so arranged in the product receiving stage 22 that the product conveyed from the cylindrical body 15 provided with screw blade 24 is supplied at a right angle to the axis of the rotor 17 or the axis of its front catching zone 18. Thereby an unobjectionable transfer of the product from the cylindrical body 15 to the rotor 17 takes place. Then the product is transported in a known manner helically outwardly around both rotors 16 and 17, whose direction of rotation is identical for this purpose. The further threshing and separating step is known and therefore is not described in detail.

The second cylindrical body 14 is arranged prior to the cylindrical body 15 of the transferring arrangement 13, as can be seen from FIG. 2 and described hereinabove. The cylindrical body 14 takes the product transported by the inclined conveyor and transfers the same to the cylindrical body 15. For this purpose, the body 14 is provided in its portion associated with the rotor 17 with a screw blade 25, and in its portion corresponding to the rotor 16 with axially extending elastic shovel strips 26.

A bottom 27 located under the cylindrical body 14 is formed trough-shaped, at least in the region in which the body 14 is provided with the screw blade 25. The trough shape can also extend over the entire axial length of the body 14. It is also possible that the body 27 is formed flat or approximately flat under the shovel strip 26. A bottom 28 extending under the body 15 provided with the screw blade 24 is also trough-shaped and opens in the housing 20 in the region of the product receiving stage 22.

Because of the inventive design of the transfer device 13, it becomes possible to solve a problem which the harvester threshers with axial flow encountered for a long time. More particularly, it becomes possible to carry out the product transfer from the inclined conveyor to the axial threshing unit and particularly through the supply at a right angle of the product to an axial threshing unit after the preceding turning. It should be mentioned that axles 29 and 30 of the rotors 16 and 17 are driven and supported in angled housing parts 31 and 32 in their rear regions, as considered in the travelling direction. In the front regions, the axles 29 and 30 are freely rotatably supported in traverse 33 and 34 which are fixedly connected with the walls of the housing 20.

The invention is not limited to the shown example, and the inventive features can be also used in a harvester thresher in which the axially lying rotors serve for separation and in which between the inclined conveyor 12 and the transferring device 13 a transversely extending threshing drum or another threshing unit is arranged.

It will be understood that each of the elements described above, or two or more together, may also find a useful application in other types of constructions differing from the types described above.

While the invention has been illustrated and described as embodied in a self-propelled harvester thresher with an axial product flow, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A self-propelled harvester thresher with an axial product flow, comprising a housing having an axis, a product inlet opening and a product outlet opening; an inclined conveyor transporting the product to said product inlet opening; and two axially extending rotors which form together with said housing an annular chamber extending between said product inlet opening and said product outlet opening and having a separating zone, said rotors extending parallel to one another and being offset relative to one another in an axial direction so as to form by said offset a product receiving stage and a product discharging stage.

2. A self-propelled harvester thresher as defined in claim 1, wherein said product receiving stage is associated with said product inlet opening; and further comprising product transferring means located between said inclined conveyor and said rotors and including a first cylindrical body extending over the entire width of said inclined conveyor and having one portion provided with screw blades and another portion provided with axially extending shovel strips, and a second cylindrical body extending parallel to said first cylindrical body and provided only with screw blades, said second cylindrical body having a discharge end connected with said product inlet opening of said product receiving stage.

3. A self-propeller harvester thresher as defined in claim 2, wherein said product transferring means is arranged so that the product is transported by said inclined conveyor is turned by said product transferring means by 90° and supplied at a right angle to said rotors.

4. A self-propelled harvester thresher as defined in claim 2, wherein said second cylindrical body has a predetermined length, said one portion of said first cylindrical body, which is provided with said screw blades, has a length corresponding to the length of said second cylindrical body.

5. A self-propelled harvester thresher as defined in claim 1; and further comprising a threshing element arranged so that the product is supplied from said inclined conveyor to said product outlet opening via said threshing element.

6. A self-propelled harvester thresher as defined in claim 1, wherein said housing surrounds both said rotors.

7. A self-propelled harvester thresher as defined in claim 1, wherein said rotors are driven in identical directions; and further comprising drive means for driving said rotors in identical directions.

8. A self-propelled harvester thresher as defined in claim 1; and further comprising bottom members each associated with a respective one of said cylindrical bodies and having a trough shape at least in a region in which each of said cylindrical bodies is provided with said screw blades.

* * * * *